United States Patent
Dejean

(10) Patent No.: US 8,974,008 B2
(45) Date of Patent: Mar. 10, 2015

(54) DRIVEN WHEEL ASSEMBLY AND AUTOMOTIVE VEHICLE EQUIPPED WITH SUCH AN ASSEMBLY

(75) Inventor: Gilles Dejean, Chaponost (FR)

(73) Assignee: Renault Trucks, St. Priest (FR)

( * ) Notice: Subject to any disclaimer, the term of this patent is extended or adjusted under 35 U.S.C. 154(b) by 402 days.

(21) Appl. No.: 13/514,302

(22) PCT Filed: Dec. 11, 2009

(86) PCT No.: PCT/IB2009/007966
§ 371 (c)(1),
(2), (4) Date: Jun. 7, 2012

(87) PCT Pub. No.: WO2011/070387
PCT Pub. Date: Jun. 16, 2011

(65) Prior Publication Data
US 2012/0235463 A1 Sep. 20, 2012

(51) Int. Cl.
*B60B 35/00* (2006.01)
*B60B 27/00* (2006.01)
*B60B 35/12* (2006.01)

(52) U.S. Cl.
CPC ............. *B60B 27/001* (2013.01); *B60B 35/121* (2013.01)
USPC ......... 301/124.1; 301/6.8; 301/105.1; 188/17

(58) Field of Classification Search
CPC ....... B60T 1/00; B60T 1/065; B60B 27/0015; B60B 27/0021; B60B 27/0052; B60B 35/121; F16D 65/12; F16D 2065/138; F16D 2065/1384; F16D 2065/1388
USPC ......... 301/6.1, 6.6, 6.8, 124.1, 105.1; 188/17, 188/18 A, 218 XL
See application file for complete search history.

(56) References Cited

U.S. PATENT DOCUMENTS

| | | | | |
|---|---|---|---|---|
| 1,685,429 A * | 9/1928 | Masury | ........................... | 301/6.1 |
| 1,713,963 A * | 5/1929 | Gurney | ........................... | 301/6.1 |
| 1,973,837 A * | 9/1934 | Youngren | ....................... | 301/6.1 |
| 2,095,054 A * | 10/1937 | Burger | ............................ | 301/6.1 |
| 4,986,608 A * | 1/1991 | Fett | ............................. | 301/124.1 |
| 6,676,228 B1 * | 1/2004 | Varela et al. | .................... | 301/6.1 |
| 8,137,000 B2 * | 3/2012 | Stephan et al. | ............. | 301/105.1 |
| 2001/0011619 A1 * | 8/2001 | Giorgetti et al. | ........ | 188/218 XL |
| 2003/0111893 A1 | 6/2003 | Hamperl | | |

FOREIGN PATENT DOCUMENTS

| | | |
|---|---|---|
| DE | 3721737 A1 | 1/1989 |
| DE | 19961710 C1 | 2/2001 |
| EP | 0799723 A | 10/1997 |
| FR | 2921302 A1 | 3/2009 |

OTHER PUBLICATIONS

Machine translation of DE3721737, 4 pages.*
International Search Report (Mar. 17, 2010) for corresponding International application No. PCT/IB2009/007966.

* cited by examiner

*Primary Examiner* — Jason Bellinger
(74) *Attorney, Agent, or Firm* — WRB-IP LLP

(57) ABSTRACT

A wheel assembly includes a fixed axle spindle, a rotating drive shaft extending inside the axle spindle, a bearing, a hub, a brake disc, and a wheel rim. An inner ring of the bearing is mounted on the spindle, the hub is mounted on an outer ring of the bearing and the drive shaft, the brake disc and the rim are fast in rotation with the hub. The drive shaft is mounted on the hub, the brake disc is mounted on the drive shaft and the rim is mounted on the brake disc, in that order, from an interior side to an exterior side of the wheel assembly with respect to a vehicle provided with said wheel assembly.

10 Claims, 4 Drawing Sheets

US 8,974,008 B2

DRIVEN WHEEL ASSEMBLY AND AUTOMOTIVE VEHICLE EQUIPPED WITH SUCH AN ASSEMBLY

BACKGROUND AND SUMMARY

The present invention relates to a driven wheel assembly. More particularly, the present invention relates to a driven wheel assembly comprising an axle spindle, a rotating drive shaft, a bearing, a hub, a brake disc and a wheel rim. The invention also concerns an automotive vehicle, such as a truck, equipped with such a driven wheel assembly.

Known driven wheel assemblies for vehicles, particularly large commercial vehicles, are provided with a drive shaft, a fixed axle spindle, a brake disc and bearings. These assemblies need maintenance operations, such as changing of brake discs, which may need removals of some parts of the assembly. Removal of a bearing is usually needed. This operation can be very costly, as it may need a high disassembly time and special mounting tools. Changing of brake discs is an operation which can be repeated several times over the lifetime of the vehicle, especially in the case of heavy-weight vehicles such as trucks and buses. This needs to be easy and fast. Moreover, maintenance of known assemblies induces the loss of the oil which lubricates the differential.

FR-A-2 921 302 discloses a brake disc mounted directly on a rotating drive shaft. The rotating drive shaft is mounted on the inner ring of the bearing, the outer ring being mounted on a fixed spindle. With this assembly, removal of the brake disc is easy but the drive shaft cannot be removed without removing the bearing and emptying the oil.

This invention aims, according to an aspect thereof, at proposing a new driven wheel assembly which allows an easy removal of the brake disc, without handling the bearing or emptying the oil, but also to remove the drive shaft without having to remove the bearing.

To this end, the invention relates, according to an aspect thereof, to a driven wheel assembly comprising a fixed axle spindle, a rotating drive shaft extending inside the axle spindle, a bearing, a hub, a brake disc and a wheel rim, an inner ring of the bearing being mounted on the spindle, whereas the hub is mounted on an outer ring of the bearing, and whereas the drive shaft, the brake disc and the rim are fast in rotation with the hub. This driven wheel assembly is characterized in that the drive shaft is mounted on the hub, the brake disc is mounted on the drive shaft, the rim is mounted on the brake disc, in that order, from an interior side to an exterior side of said wheel assembly with respect to a vehicle provided with said wheel assembly.

Thanks to the invention, the brake disc can be easily removed from the assembly. This operation only requires to un-screw screws securing the wheel rim and the brake disc on the hub. The re-mounting operation is also very fast and simple. The drive shaft can also be easily removed from the assembly without removing the bearing. The mounting of the various parts of the assembly permits fast and easy removing operations.

According to further aspects of the invention which are advantageous but not compulsory, such an assembly may incorporate one or several of the following features:

Each of the drive shaft, the brake disc and the wheel rim is provided with a radially extending mounting flange, whereas the three flanges are adapted to be mounted against each other, in the order in which the drive shaft, the brake disc and the wheel rim are mounted, and whereas the hub is provided with a mounting surface perpendicular to a longitudinal axis of the hub, adapted to lie against the flange of the drive shaft.

The drive shaft, the brake disc and the wheel rim are secured on the hub by the same screws.

The screws are mounted through the three flanges and screwed in the hub.

The screws are screwed in the hub perpendicularly to the mounting surface.

The drive shaft is secured on the hubby at least one additional screw.

The brake disc is secured on the drive shaft by at least one additional screw.

The mounting flanges of the drive shaft and/or the brake disc is/are provided with counter bores adapted to receive the head of the additional screw(s).

The drive shaft, the hub, the bearing and the axle spindle define together a closed oil containing volume.

The brake disc can be removed from the spindle without opening the oil containing volume.

The invention also concerns an automotive vehicle, in particular a truck, equipped with such a wheel assembly.

BRIEF DESCRIPTION OF THE DRAWINGS

The invention will now be explained in correspondence with the annexed figures and as an illustrative example, without restricting the object of the invention. In the annexed figures.

DETAILED DESCRIPTION

Figure 1:
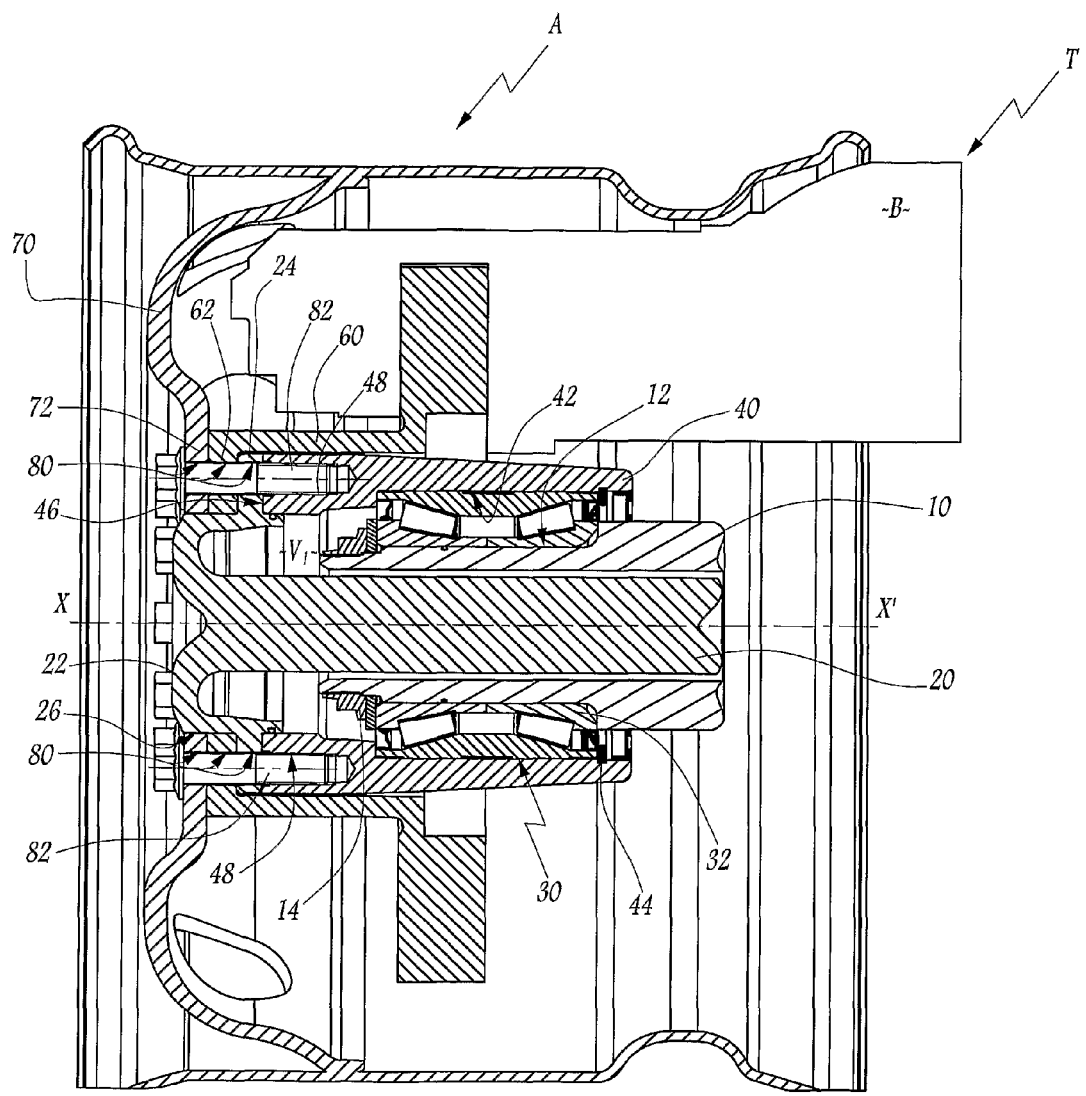
FIG. 1 is a cross sectional view through the rotational axis of a driven wheel assembly according to the invention.
Figure 2:
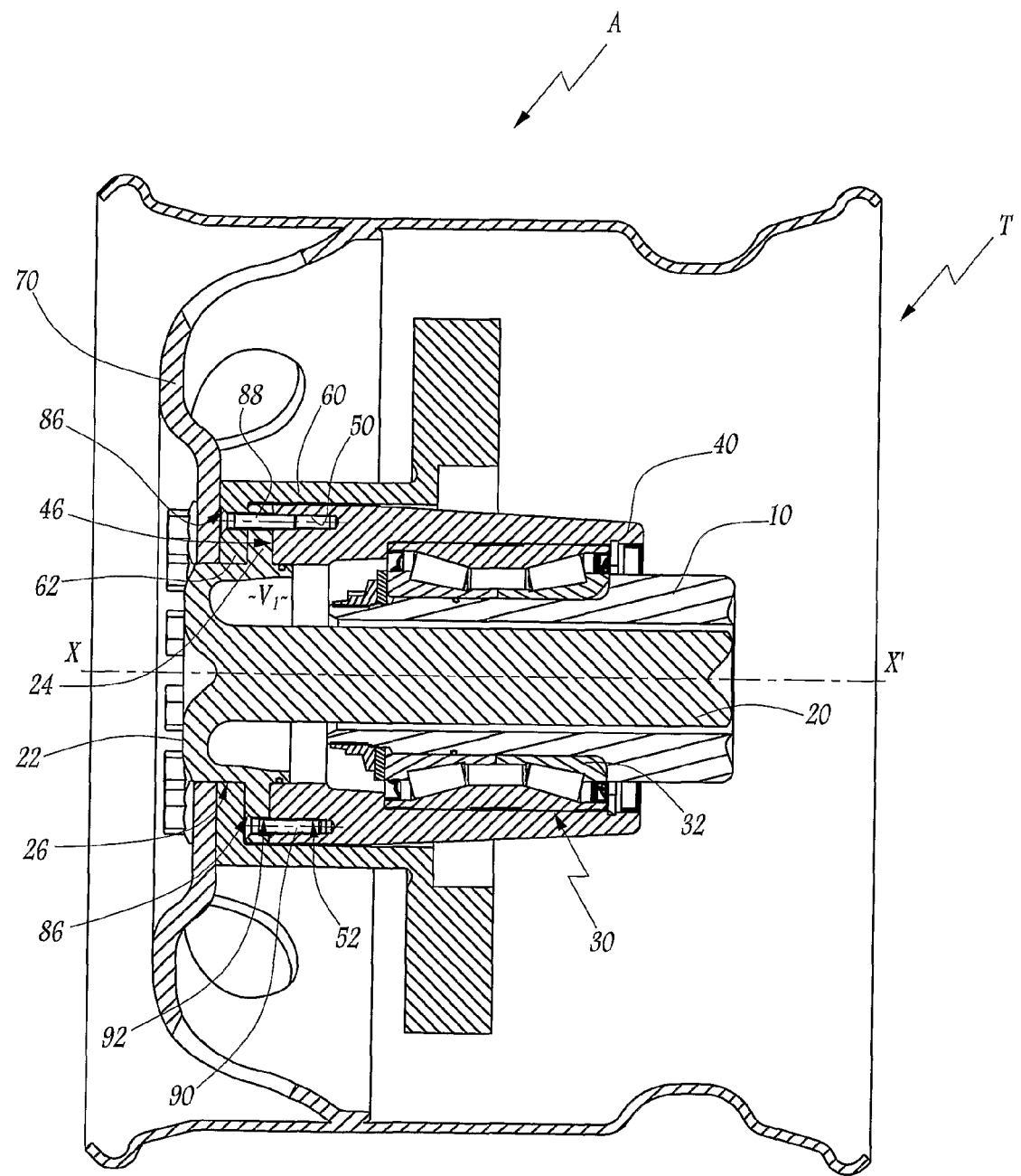
FIG. 2 is a view similar to FIG. 1, with a differently oriented sectional plan.
Figure 3:
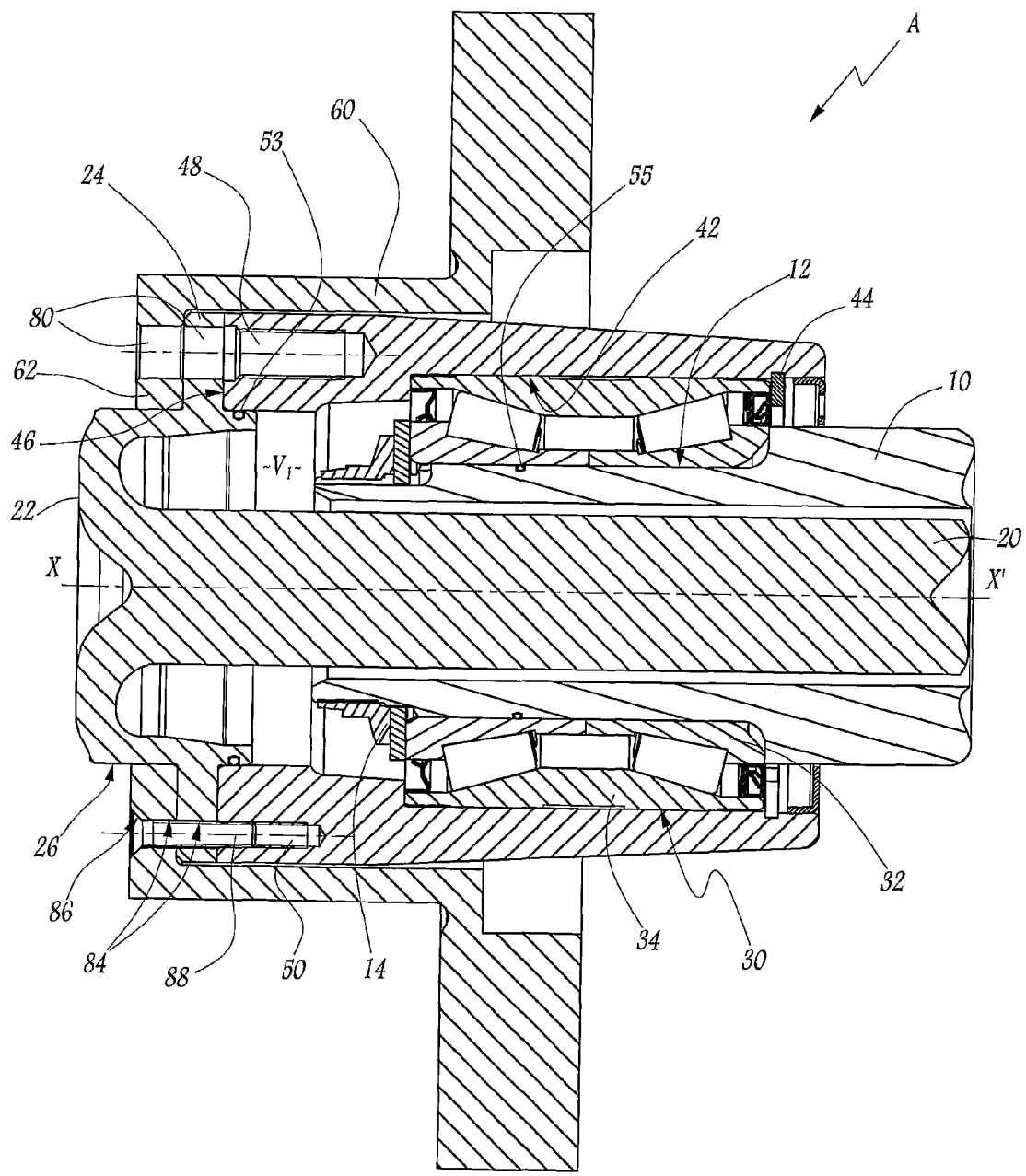
FIG. 3 is a cross sectional view at a larger scale through the rotational axis of the wheel assembly of FIG. 1, on which a rim and screws are hidden.
Figure 4:
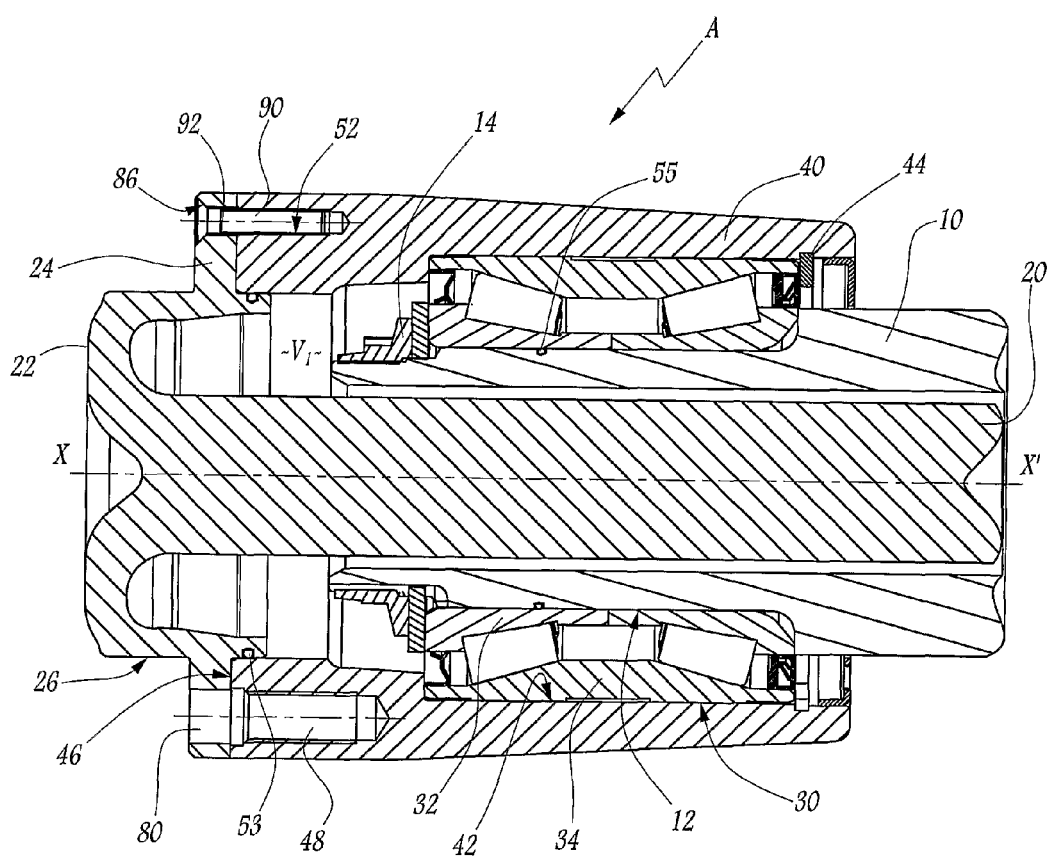
FIG. 4 is a view similar to FIG. 3, in which a brake disc is hidden.

As illustrated on FIGS. 1 and 2, a driven wheel assembly A comprises an axle spindle 10, which is fixed with respect to a vehicle, such as a truck T, provided with the wheel assembly. The axle spindle 10 is partly shown on the figures and includes a tubular part extending along a longitudinal axis X-X'. The axle spindle can be part of an axle casing extending along the axis of the axle, said casing comprising a central differential housing and, on each side, at each of its extremities, an axle spindle.

The assembly A includes a drive shaft 20 extending inside the axle spindle 0. The shaft 20 rotates inside the axle spindle 10 about the axis X-X'. The rotative motion of the shaft 20 may be delivered by a driveline of the vehicle, especially by a differential contained in the central part of the axle casing, which is not shown on the figures. Only one end 22 of the shaft 20 is shown on the figures, the other end being connected to a differential of the vehicle which is not represented. The end 22 defines the outward direction of the vehicle.

The assembly A also includes a bearing 30. The bearing can be maintenance free and be may sealed so that no further addition of grease is required during the lifetime of the bearing. The bearing is for example a double conical roller bearing. The inner ring 32 of the bearing 30 is mounted on a shoulder 12 of the external surface of the spindle 10. The inner ring is therefore static. In the shown example, the inner ring comprises two parts, an inward part supporting an inward set of rollers, and an outward part supporting an outward set of rollers. The outer ring 34 of the bearing 30 is mounted radially inside a hub 40 provided with a tubular shaped body extending about axis X-X'. The outer ring 34 is mounted on a shoulder 42 of the internal surface of the hub 40. The outer ring 34 is fast in translation with the hub 40 by an internal retaining ring 44. The inner ring 32 is secured in translation on the spindle 0 through a nut 14 which screwed on the end of the spindle and which lies against the inner ring 32 via a washer. A sealing O-ring 55 may be provided in a corresponding annular groove in the cylindrical surface of the axle spindle shoulder 12, under the outward part of the inner ring 32. The O-ring 55 avoids an oil leakage towards the inside of the bearing.

The drive shaft 20 is provided, on its end 22, with a mounting flange 24. This flange 24 extends radially with respect to axis X-X' and departs from this axis. This mounting flange 24 is adapted to lie against a mounting surface 46 of the hub 40, perpendicular to axis X-X'. This mourning surface 46 is an annular surface and extends radially between the internal and external surfaces of the hub 40. The mounting flange 24 may further comprise a tubular centering projection extending inwardly along axis X-X' and having an external diameter equal to the inner diameter of the hub 40. A sealing O-ring 53 may be provided in a groove formed on the external surface of said centering projection, for preventing any leak of oil at the hub/mounting flange interface.

The driven wheel assembly A also includes a brake disc 60. The brake disc 60 is provided with a tubular part which extends along axis X-X'. It is provided, on one end, with a radially externally extending friction part which is engaged in a brake calliper of the braking system B of the vehicle. On its other end, the brake disc 60 is provided with a radially internally extending mounting flange 62, advancing towards axis X-X', and adapted to lie against the mounting flange 24 of the shaft 20.

The assembly includes also a wheel rim 70 provided with a radially extending mounting flange 72. This flange 72 is adapted to lie against the mounting flange 62 of the brake disc 60. In the shown embodiment, the flange 72 is integral with the wheel rim 72, but the flange 72 can be a separate part on which the wheel rim can be mounted through a further set of screws.

The drive shaft 20 is provided, on its end 22, with an external cylindrical surface 26 extending along axis X-X'. This cylindrical surface 26 is delimited on one side by the end 22 of the shaft 20 and, on the other side, by the mounting flange 24.

Mounting flanges 62 and 72 are adapted to lie around the cylindrical surface 26 of the shaft 20.

Mounting flanges 24, 62 and 72 are each provided with the same number of bores 80, which can be aligned with each other. Those bores 80 are drilled along several axes parallel to axis X-X'. Bores 80 are distributed regularly around the circumferences of the three flanges. Only bores 80 located in the sectional plan of FIG. 1 are visible. One bore 80 of each of the mounting flanges 24, 62 and 72 aligned together forms a passageway through these three mounting flanges.

These bores 80 may be aligned with the same number of bores 48 drilled along the same axis X-X' as bores 80 in the hub 40 and perpendicularly to mounting surface 46. These bores 48 are provided with threads in which screws 82 can be screwed. These screws 82 are mounted through the three mounting flanges 24, 62 and 72. These screws 82 fasten the assembly by pressing the wheel rim 70, the brake disc 60, and the drive shaft 20 against the hub 40.

Preferably it can be provided means for preventing the disassembly of the disc 60 and of the drive shaft 20 from the hub 40 when only the wheel rim needs to be dismounted from the assembly. Therefore, in the same manner as bores 80 and threaded bores 48 are located and drilled, at least one additional bore 84 is drilled in the mounting flanges 62 and 24 of the disc 60 and of the drive shaft 20. This additional bore 84 is aligned with an additional threaded bore 50 drilled in the hub 40. Additional bores 84 and 50 are arranged angularly in a space between two bores 82. Bore 84 of the mounting flange 62 has, on its outwardly opened end, an enlargement 86 adapted to receive the head of an additional screw 88. The enlargement 86 accommodates the head of additional screw 88 which has a corresponding shape. Therefore, the head of additional screw 88 is entirely received within the enlargement and does not protrude outwardly, so that a good contact between the mounting flanges 24 of the shaft 20 and 62 of the brake disc 60 may be achieved. The additional screw 88 are each mounted through the mounting flanges 62 and 24 and screwed in the threads of additional bore 50. Of course, several such additional screws, with corresponding bores 84, 50, may be provided at different locations around axis X-X'.

Similar bores and screws may be provided to fasten the drive shaft 20 with the hub 40 when only the wheel rim and the disc brake need to be dismounted. To this end, the mounting flange 24 of the drive shaft 20 is provided with at least one through bore 92 with an outward enlargement 86 adapted to receive the head of another additional screw 90. This additional screw 90 is mounted through bore 92 in the mounting flange 24 of the drive shaft 20 and is screwed in a threaded bore 52 of hub 40.

Additional screw 90 is mounted angularly in a space between adjacent screws 82. Several additional screws 90, and the corresponding bores 92, 52, may be provided.

In case brake disc 60 has to be removed, for instance because it is worn out, one can remove screws 82 and remove the wheel rim 70. Then, additional screws 88 can be removed in order to remove brake disc 60. These operations are very easy and do not need any operations on the bearings.

Some oil contained in a closed internal volume Vi delimited by the drive shaft 20, the hub 40, the bearing 30 and the spindle 10 is used to lubricate the differential. The removal of the brake disc 60 does not imply opening of the volume Vi. Thus, no oil is spoiled when one works on the brake disc 60.

The reassembling of the disc 60 and the rim 70 is also very simple. One just needs to align the various bores with each other and to screw again screws 88 and 82.

Counter bores 86 are particularly useful in the securing of the drive shaft 20 with the hub 40. They permit a good contact between the flange 24 and the mounting surface 46 by imbedding the heads of additional screws 90, and secure the tightness of the oil containing volume V1.

If, for any reason, the shaft 20 has to be removed, the operation needed remains quite simple. One just needs to remove additional screws 90 and to empty the lubrication oil contained in the volume. Then, the shaft 20 can be removed from the hub 40. The removal of the shaft 20 does not need any operation on the bearing 30, because the shaft is not directly connected to any of the rings of the bearing 30. The fact that the inner ring 32 is fixed with respect to the spindle 10 permits an easy removal of the shaft 20.

The invention is applicable with trucks, buses, cars and any other automotive vehicle.

The invention claimed is:

1. Driven wheel assembly comprising:
   a fixed axle spindle,
   a rotating drive shaft extending inside the axle spindle,
   a bearing,
   a hub, a brake disc,
a wheel rim,
an inner ring of the bearing being mounted on the spindle, whereas the hub is mounted on an outer ring of the bearing and the drive shaft, the brake disc and the wheel rim are secured on the hub with the same screws,
wherein:
the drive shaft is mounted on the hub,
the brake disc is mounted on the drive shaft,
the rim is mounted on the brake disc,
in that order, from an interior side to an exterior side of the wheel assembly with respect to a vehicle provided with the wheel assembly.

2. Driven wheel assembly according to claim 1, wherein each of the drive shaft, the brake disc and the wheel rim is provided with a radially extending mounting flange, wherein the three flanges are adapted to be mounted against each other, in the order in which the drive shaft, the brake disc and the wheel rim are mounted, and wherein the hub is provided with a mounting surface perpendicular to a longitudinal axis of the hub, adapted to lie against the flange of the drive shaft.

3. Driven wheel assembly according to claim 2, wherein the screws are mounted through the three flanges and screwed in the hub.

4. Driven wheel assembly according to claim 3, wherein wherein the screws are mounted through the three flanges and are screwed in the hub perpendicularly to the mounting surface.

5. Driven wheel assembly according to claim 1, wherein the drive shaft is secured on the hub by at least one additional screw.

6. Driven wheel assembly according, to claim 1, wherein the brake disc is secured on the hub by at least one additional screw.

7. Driven wheel assembly according to claim 5, wherein the mounting flanges of the drive shaft and/or the brake disc is/are provided with enlargements adapted to receive the head of the additional screws.

8. Driven wheel assembly according to claim 5, wherein the drive shaft, the hub, the bearing and the axle spindle define together a closed oil containing volume.

9. Driven wheel assembly according to claim 8, wherein the disc can be removed from the spindle without opening the volume.

10. Automotive vehicle equipped with a driven wheel assembly according to claim 1.

* * * * *